3,151,172
PROCESS FOR PRODUCING METHYL CYCLO-
PENTANE FROM BUTYL CYCLOHEXANES
Robert J. White, San Francisco, Calif., assignor to
California Research Corporation, San Francisco, Calif.,
a corporation of Delaware
No Drawing. Filed June 23, 1960, Ser. No. 39,212
2 Claims. (Cl. 260—666)

This invention relates to the conversion of naphthenic hydrocarbons and, more particularly, to the conversion of butyl cyclohexanes to methyl cyclopentane.

The present invention is directed to a process for producing methyl cyclopentane in high yields from a hydrocarbon feed comprised predominantly of unsubstituted butyl cyclohexanes which comprises contacting the feedstock, preferably along with at least 750 s.c.f. of hydrogen per barrel of said feedstock, in a conversion zone with a cracking catalyst at an elevated temperature below about 700° F., a pressure of as least 175 p.s.i.g., and at a liquid hourly space velocity above 0.1 v./v./hr. A normally liquid product, boiling below the initial boiling point of the feedstock and containing predominant amounts of methyl cyclopentane, is recovered from the conversion zone. Additionally, the normally gaseous hydrocarbon product recovered from the conversion zone is composed predominantly of isobutane.

As previously defined, the feedstock employed in the process is one that is predominantly composed of either one or more unsubstituted butyl cyclohexanes. Thus, the feed is predominantly made up of normal butyl, isobutyl, secondary butyl, and/or tertiary butyl cyclohexane. It is preferred that the feedstock contain at least 75 mol percent of such naphthenes and, even more preferably, in excess of 90 mol percent. Adidtionally, it is preferred that the feedstock be essentially free of such known catalyst poisons as water, oxygen, nitrogen, and the like.

The catalyst employed in the conversion process of the present invention is one which is generically referred to as a cracking catalyst. As used herein, the term "cracking catalyst" refers to catalysts that catalytically crack, or reduce in molecular weight, hydrocarbon feed fractions. The term includes both petroleum cracking catalysts and petroleum hydrocracking catalysts, the latter being catalysts that promote cracking in the presence of added hydrogen.

Suitable cracking catalysts for the process of the present invention are petroleum cracking catalysts which may be selected from a variety of solid materials of the type having high cracking activity. Among solid compositions which can be used are the various siliceous cracking catalysts, acid-activated aluminas, those wherein alumina is chemically bonded to aluminum chloride, fluorided magnesium oxide, and aluminum chloride, particularly when contained within the pores of a support, such as charcoal, so as to reduce vaporization of the aluminum chloride.

In general, it is preferred to employ a solid siliceous material as the petroleum cracking catalyst. For example, there may be used composites of silica-alumina, silica-magnesia, silica-alumina-zirconia, acid-treated clays, and the like, as well as synthetic metal aluminum silicates (including synthetic chabazites, normally referred to as "molecular sieves") which have been found to impart the necessary degree of cracking activity. Particularly preferred siliceous cracking catalysts are synthetically-prepared silica-alumina compositions having a silica content in the range of from about 40 to 99%, by weight.

In addition to the petroleum cracking catalysts, it has been found that petroleum hydrocracking catalysts are suitable, and normally preferred, for use in the present process. Basically, these catalysts are composed of an acid material having hydrogenating characteristics and high cracking activity. These hydrocracking catalysts are generally made up of petroleum cracking catalysts as supports upon which hydrogenating components have been disposed. Accordingly, the solid petroleum cracking catalysts described hereinbefore are suitable for use as the support for the petroleum hydrocracking catalysts of the present invention. The preferred cracking catalysts hereinbefore described are also preferred for use as the petroleum hydrocracking catalyst support.

Broadly speaking, the hydrogenating component of the petroleum hydrocracking catalysts may comprise one or more of the metals, and compounds of such metals, in groups I(B), II(B), V, VI, VII, and VII of the Periodic Table. Further, it is preferred that the hydrogenating component of the catalyst be selected from one or more of the various compounds of metals falling within the aforesaid groups which are not readily reduced to the corresponding metal from under the preferred reducing conditions prevailing in the conversion zone. Thus, while the invention is operable with catalysts such as those having nickel oxide or cobalt oxide which are readily reduced in the presence of hydrogen to the corresponding metal form in the conversion zone, it is preferred to use compounds not readily reduced, such as an oxide or sulfide of molybdenum, tungsten, chromium, rhenium or zinc, or a sulfide of cobalt, nickel, copper or cadmium; other hydrogenating materials falling within this preferred category are complexes of the various metals of the defined groups, such, for example, as cobalt-chromium, and nickel-chromium. An exception to the general preference for hydrogenating components that are not reduced to the metal form in the conversion zone is the use of a platinum hydrogenating component disposed upon an alumina support upon which is sublimed aluminum chloride. This latter catalyst is particularly preferred for use in the present process. Also, especially preferred catalysts are those in which nickel sulfide and/or cobalt sulfide is disposed upon a synthetic silica-alumina cracking catalyst. The amount of the hydrogenating component may be varied within relatively wide limits of from about 0.1 to 35% or more, based on the weight of the entire catalyst composition.

In the operation of the subject process, the feedstock can be introduced to the reaction zone as either a liquid, vapor, or mixed liquid-vapor phase, depending on the temperature, pressure, proportions of hydrogen, and boiling range of the feedstocks. Although the presence of added hydrogen is not necessary, it is preferred that the feed be introduced in an admixture with at least 750 s.c.f. of hydrogen per barrel of total feed and, even more preferably, with from 1000 to 2000 s.c.f. per barrel of feed. When employed, the hydrogen stream admixed with the incoming feed is conventionally made up of recycled gas recovered from the effluent of the reaction zone, together with fresh make-up hydrogen. The hydrogen content of the recycle gas stream, in practice, generally ranges upwardly of 70 volume percent.

Pressures employed in the conversion zone are at least 175 p.s.i.g., and may range upwardly to as high as 2500 p.s.i.g. or higher, with a preferred range being a total pressure of from about 500 to 1800 p.s.i.g Generally, the conversion zone feedstock may be introduced into the reaction zone at an LHSV of from about 0.1 to 15 v./v./hr. (volumes of hydrocarbon calculated as liquid per superficial volume of catalyst), with a preferred rate being from about 0.5 to 8 v./v./hr.

One of the most important aspects of the present process is that the reaction is conducted at considerably lower temperatures than is generally associated with cracking reactions. Thus, it has been found that the conversion zone should be maintained at elevated temperatures below about 700° F., and preferably below about 600° F. It has been found that at temperatures above about 650° F., converting the feedstocks by the subject process leads to increased ring rupture, thereby reducing the total number of ring structures in the product, and increasing the production of relatively low boiling isoparaffins. Although the latter are predominantly isobutanes, the production of lower boiling naphthenic compounds is reduced.

EXPERIMENTAL

A number of experimental runs were made on the conversion of pure, unsubstituted butyl cyclohexanes. These runs were made in a continuous flow, fixed bed, high pressure, microcatalytic unit. The 6 ml. of catalyst was supported inside of 0.79 cm. I.D. stainless steel tube which was surrounded by a heavy-walled steel block inside an electrically-heated oven. Catalyst temperatures were measured by a Chromel-Alumel thermocouple located on the reactor wall at the central portion of the catalyst bed. Hydrocarbon feed rates were measured by a Micro-feeder pump and the hydrogen rate was measured by oil displacement in a reservoir.

Liquid products were analyzed by gas chromatography and the accuracy of the method confirmed by analysis of known mixtures of similar hydrocarbons. The gaseous portion of the product was analyzed by mass spectrometry.

Of the following six separate catalysts, only Catalyst A was employed in the runs set forth in the examples. However, all of the other catalysts can be employed to attain the desired results.

CATALYST A

This hydrocracking catalyst, preferred for use in the subject process, was prepared by impregnating 126 cubic centimeters of silica-alumina (about 90 percent silica and 10 percent alumina) cracking catalyst fines with a solution of nickel nitrate to dispose 6 weight percent on the catalyst support. The catalyst was dried in a kiln to 600° F. and then heated (thermactivated) by contact for 2.2 hours with hot air (15 s.c.f. per minute) at an average temperature of 1427° F. The nickel oxide was then reduced by contacting the catalyst with once-through hydrogen (1.6 cubic feet per hour) at atmospheric pressure while heating from 60° to 570° F. at 100°F. per hour, and thereafter contacting the catalyst with hydrogen (1.6 s.c.f. per hour) at 1500 p.s.i.g and 570° F. for one hour. Sulfiding of the nickel component was performed by contacting the catalyst with a solution (66 cc. per hour) of 2.6 theories of 10 weight percent isopropyl mercaptan in hexane for 3.5 hours at 1500 p.s.i.g and 570° F. Hydrogen (2.22 s.c.f. per hour) was simultaneously passed over the catalyst at a rate so as to give 2 percent $H_2S$ in the gas.

CATALYST B

This catalyst was prepared in the identical manner as Catalyst A except that, following reduction of the nickel oxide to nickel metal, no sulfiding was done. Thus, Catalyst B was composed of 6 weight percent metallic nickel disposed on the cracking support.

CATALYST C

This hydrocracking catalyst was prepared by impregnating 120 cc. of synthetic silica-alumina (about 90 percent silica and 10 percent alumina) 8–14 mesh cracking catalyst (tempered for 24 hours at 1400° F. in dry air) with a solution of nickel nitrate. The nickel on the catalyst amounted to 5.3 weight percent of its total weight. The catalyst was then dried for 10 hours at 250° F. and 10 more hours at 1000° F. The nickel oxide was then reduced by (1) contacting the catalyst for one half hour at 500° F. and atmospheric pressure with 6 cubic feet per hour of hydrogen, and (2) contacting the catalyst for one hour at 580° F. and 1200 p.s.i.g. with about 0.11 cubic foot per hour of hydrogen. The nickel was then substantially sulfided by contacting the catalyst for three hours at 580° F. and 1200 p.s.i.g with 0.33 s.c.f. per hour of 2 percent $H_2S$ in hydrogen.

CATALYST D

This hydrocracking catalyst was prepared by impregnating $\frac{1}{16}$-inch alumina extrudate with a nickel nitrate solution. The nickel on the catalyst amounted to 6.66 weight percent of the entire weight of the catalyst. The latter was dried for 20 hours at 400° F. and atmospheric pressure and then calcined by heating from 4 hours at 900° F. at atmospheric presure. The nickel oxide was then reduced by contacting the catalyst with about 0.1 s.c.f. per hour of hydrogen at 900° F. and about 1100 p.s.i.g. The catalyst was then sulfided in situ (in the reactor) by passing feed and dimethyl disulfide in the reaction zone. After 4 hours, the disulfide was cut off and $BF_3$ and feed, at a ratio of 1:10, was fed with hydrogen to the reaction zone at a rate of 6 ml. per hour at a pressure of 1185 p.s.i.g ($BF_3$ partial pressure 12 p.s.i.g.). Thus, the catalyst was a $BF_3$-activated alumina support having a nickel sulfide hydrogenating component disposed thereon.

CATALYST E

This petroleum cracking catalyst was simply a conventional cracking catalyst of 8–14 mesh synthetic silica (about 90%)-alumina (about 10%) that was employed in the hydrocracking-type Catalysts A, B and C as the catalyst support.

CATALYST F

This preferred catalyst is prepared, for example, by the method described in Union of South Africa Patent No. 834 which comprises subliming aluminum chloride onto a preformed composite of platinum and fluorided alumina, and heating the treated composite at a temperature of from about 750° to 1100° F. for a time (generally in excess of one hour) until substantially all of the unreacted aluminum chloride has been removed. The catalyst contains about 95 percent alumina, about 0.36 percent platinum, about 4.4 percent chloride and about 0.32 percent fluoride. (All percentages are weight percent based on the weight of the entire catalyst.)

*Example 1.—Run 583*

Essentially pure normal butyl cyclohexane was contacted (in the above-described apparatus), along with 8.6 mols of hydrogen per mol of feed at a hydrogen rate of 6510 s.c.f. per barrel of feed, with Catalyst A at a temperature of 554° F., a pressure of 1185 p.s.i.g., and an LHSV of 8.0 v./v./hr. A conversion of the feed to lower molecular weight products of 47.6 mol percent was attained. The analysis of the entire hydrocarbon reaction product is given in Table I below.

*Example 2.—Run 670*

Essentially pure isobutyl cyclohexane was contacted in the manner of Example 1 except that the reaction temperature was 546° F. and the hydrogen rate was 6521 s.c.f. per barrel of feed. A feedstock conversion of 33.9 mol percent was attained. Table I presents the analysis of the hydrocarbon reaction product.

*Example 3.—Run 598*

Essentially pure secondary butyl cyclohexane was contacted in the manner of Example 1 except that 8.5 mols of hydrogen were employed at a rate of 6470 s.c.f. per barrel of feed and the reaction temperature was 558° F. A feed conversion of 57.1 mol percent resulted. The analysis of the hydrocarbon reaction product is shown in Table I.

*Example 4.—Run 652*

Essentially pure tertiary butyl cyclohexane was contacted in the manner of Example 1, except that 8.3 mols of hydrogen were employed at a rate of 6450 s.c.f. per barrel of feed and the reaction temperature was 555° F. A feed conversion of 36.4 mol percent was realized. The product analysis is given in Table I.

TABLE I

| Product, mols/100 mols feed | Run 583 | Run 670 | Run 598 | Run 652 |
|---|---|---|---|---|
| Methane | 0.02 | 0 | 0.01 | 0 |
| Ethane | 0.1 | 0 | 0.1 | 0 |
| Propane | 3.9 | 3.6 | 6.3 | 1.5 |
| iso-Butane | 35.9 | 23.4 | 37.2 | 29.6 |
| n-Butane | 1.5 | 0.8 | 1.7 | 0.9 |
| iso-Pentane | 4.8 | 2.6 | 5.6 | 2.8 |
| n-Pentane | 0.4 | 0.2 | 0.3 | 0.1 |
| iso-Hexane | 5.9 | 3.2 | 5.6 | 2.5 |
| n-Hexane | 0.2 | 0.1 | 0.2 | 0.2 |
| iso-Heptane | 0.3 | 0.2 | 0.3 | 0 |
| n-Heptane | 0 | 0 | 0 | 0 |
| $C_8$+ Paraffins | 0 | 0 | 0 | 0 |
| Cyclopentane | 0 | 0 | 0 | 0 |
| Methyl cyclopentane | 27.3 | 20.5 | 38.7 | 22.3 |
| Cyclohexane | 2.2 | 1.6 | 2.5 | 4.5 |
| Methyl cyclohexane | 3.1 | 3.8 | 4.6 | 1.6 |
| Ethyl cyclopentane | 0.5 | 0.5 | 0.6 | 0.2 |
| Dimethyl cyclopentane | 2.4 | 2.1 | 3.3 | 1.2 |
| Trimethyl cyclopentane | 0.4 | 0.2 | 0.3 | 0.3 |
| Dimethyl cyclohexane | 0.8 | 0.8 | 1.3 | 1.1 |
| Other $C_8$ naphthenes | 1.1 | 0.5 | 0.4 | 0.8 |
| Total $C_9$ naphthenes | 1.3 | 0.8 | 1.1 | 0.9 |
| Total $C_{10}$ naphthenes | 52.4 | 66.1 | 42.9 | 63.6 |

It might be noted that, in Table I, the total $C_{10}$ naphthenes recovered included both unconverted feed and isomerized $C_{10}$ naphthenes. Thus, in Run 583, out of a total of 52.4 mols of $C_{10}$ naphthenes per 100 mols of feed, 4 mols were normal butyl cyclohexane (feed) and 48.4 mols were isomerized butyl cyclohexanes. Run 670 had 17.1 mols of isobutyl cyclohexane and 49 mols of isomerized $C_{10}$ naphthenes; Run 598 had 2.4 mols of secondary butyl cyclohexane and 38.5 mols of isomerized $C_{10}$ naphthenes, and Run 652 had 48.9 mols of tertiary butyl cyclohexane and 14.7 mols of isomerized butyl cyclohexanes.

From the data set forth in Table I, the selective nature of the subject process is shown by the summarized results of Table II.

TABLE II

| | Run 583 | Run 670 | Run 598 | Run 652 |
|---|---|---|---|---|
| Mol percent isobutane in normally gaseous hydrocarbon product | 85 | 84 | 82 | 93 |
| Mol percent Methyl cyclopentane in normally liquid, lower molecular weight product | 54 | 55 | 60 | 58 |
| Mols Methyl cyclopentane/mol of feed converted to lower molecular weight product | 0.58 | 0.61 | 0.68 | 0.61 |

As can be seen from the data of Tables I and II, the process of the present invention produces large amounts of methyl cyclopentane and isobutane accompanied by extremely small quantities of methane, ethane and propane. Thus, the normally gaseous hydrocarbon product from the conversion zone, i.e., the hydrocarbon product including the butanes and lighter components, is predominantly isobutane. The normally liquid synthetic product, i.e., the reaction product containing the pentanes up to and including the $C_9$ naphthenes, is predominantly methyl cyclopentane.

I claim:

1. A process for producing methyl cyclopentane from a feedstock comprised predominantly of unsubstituted butyl cyclohexanes which comprises contacting said feedstock, along with at least 750 s.c.f. of hydrogen per barrel of said feedstock, in a conversion zone with a cracking catalyst at an elevated temperature below about 700° F., a pressure of at least 175 p.s.i.g. and at a liquid hourly space velocity above 0.1 v./v./hr., and recovering from said zone a normally liquid product, boiling below the initial boiling point of said feedstock, containing predominant amounts of methyl cyclopentane.

2. A process for converting a feedstock comprised predominantly of unsubstituted butyl cyclohexane which comprises contacting said feedstock, along with at least 750 s.c.f. of hydrogen per barrel of said feedstock, in a conversion zone with a cracking catalyst at a temperature below about 650° F., a pressure of at least 175 p.s.i.g., and at a liquid hourly space velocity above 0.1 v./v./hr., recovering from said zone a normally liquid product, boiling below the initial boiling point of said feedstock, containing at least 0.4 mol of methyl cyclopentane for every mol of unsubstituted butyl cyclohexane converted to lower molecular weight products, and a normally gaseous hydrocarbon product predominantly composed of isobutane.

References Cited in the file of this patent

UNITED STATES PATENTS 2,422,674     Haensel et al.     June 24, 1947
2,422,798     Pines     June 24, 1947